United States Patent [19]

Strommer

[11] Patent Number: 4,617,201
[45] Date of Patent: Oct. 14, 1986

[54] METHOD FOR PRODUCING A SYNTHETIC MATERIAL-CONTAINING POWDER

[75] Inventor: Erich Strommer, Schattendorf, Austria

[73] Assignee: Novophalt Societe Anonyme, Luxembourg, Luxembourg

[21] Appl. No.: 764,232

[22] Filed: Aug. 9, 1985

[51] Int. Cl.$^4$ .................. C08L 95/00; C08J 3/12; C04B 31/40; E01C 7/26
[52] U.S. Cl. .................... 427/216; 427/221; 523/205; 523/209; 524/8; 524/62; 524/433; 524/444; 524/445; 524/586
[58] Field of Search ............ 524/8, 62, 433, 445, 524/444, 586; 427/216, 221; 523/205, 209

[56] References Cited

U.S. PATENT DOCUMENTS 4,296,207 10/1981 Siegmund ........................ 524/59

FOREIGN PATENT DOCUMENTS 1805829 6/1970 Fed. Rep. of Germany .
2146915 3/1972 Fed. Rep. of Germany .
1125472 10/1956 France .
8403294 8/1984 World Int. Prop. O. .

OTHER PUBLICATIONS

Derwent Abs 18208 R/11 (BE-0738762) Feb. 1970.
Derwent Abs 80407 C/45 (SU-724546) Mar. 1980.
Derwent Abs 21731 T/14 (DT-2146915) Mar. 1971.
Derwent Abs 31846 W/19 (SU431111) Dec. 1974.
Derwent Abs 84-099865/16 (SU-1028651) Jul. 1983.
Derwent Abs 49049 A/27 (J78018179) Jun. 1978.
Derwent Abs 26686 E/14 (EP-48417) Mar. 1982.
Derwent Abs 47542 X/25 (SU492498) Nov. 1975.

*Primary Examiner*—Herbert J. Lilling
*Attorney, Agent, or Firm*—Ladas & Parry

[57] ABSTRACT

A method for producing a finely distributed powder, which contains a thermoplastic synthetic material, where, in order to form particles containing the synthetic material, thermoplastic synthetic material is introduced in a non-aqueous carrier substance, which is liquid in the melting temperature range of the synthetic material, and is mixed in the melting temperature range with the carrier substance, and ground lime is then added to this mass, and thereafter an aqueous slurry is added to the mass. By the reaction between the lime and the aqueous slurry, the mass is converted to a powder containing synthetic material, More particularly, bitumen is selected as a carrier substance. The powder can preferably be introduced to produce a synthetic material-containing bituminous binder for building materials.

20 Claims, 2 Drawing Figures

METHOD FOR PRODUCING A SYNTHETIC MATERIAL-CONTAINING POWDER

The invention relates to a method for producing a finely divided powder containing a thermoplastic synthetic material.

BACKGROUND OF THE INVENTION

The mechanical processing of thermoplastic synthetic materials, available in the form of pieces, granulate, chips, grains and the like, to a powdery synthetic material by using suitable comminuting machines, such as cutting machines, carving machines and mills, is in many respects complicated and expensive. With decreasing particle size also increases the power necessary for continuous comminution, so that even with relatively considerable power input and the use of efficient machines, only very slowly can be achieved the decrease in the particle size. This is very undesirable when substantial amounts of a finely distributed powder are to be produced from a thermoplastic synthetic material, available in much coarser form.

SUMMARY OF THE INVENTION

The object of the invention is the method of producing the above-mentioned kind, where in a relatively simple way and with low effort, particularly low consumption of power, there can be produced a powder containing finely distributed polyolefin.

DETAILED DESCRIPTION OF THE INVENTION

The method of the invention of the kind described at the outset is characterized in that a method for producing a powder containing a finely distributed thermoplastic synthetic material which steps comprise introducing polyolefin into a non-aqueous carrier substance selected from the group consisting of bitumen, fats, paraffin and waxes at the melting temperature range of the synthetic material liquid and mixing the polyolefin and carrier to obtain a homogeneous mass; adding to said mass and distributing therein ground lime; and subsequently adding an aqueous slurry selected from the group consisting of red slurry which is a waste product in the production of aluminum, rock floors, flue dust and fuller's earth, to the mass, which is converted by the then-generated reaction between the lime and the aqueous slurry to a powder containing polyolefin.

The above-stated object can be very well achieved by the steps of the invention, and in a simple way in a relatively rapid course of the method there is produced a powder containing a polyolefin in finely distributed form. The method is carried out with simple apparatus and low power input.

It is expedient in the method, in introducing the polyolefin into the carrier substance, that the carrier substance, before the introduction of the polyolefin, is heated to a temperature within the melting temperature range of the polyolefin. In such a way the mixing of the polyolefin with the carrier substance can be carried out promptly and without difficulty, and the required heating of the synthetic material to the melting range temperature can be accomplished in a very short period of time. With it it is also readily possible to introduce the polyolefin at ambient temperature into the carrier substance, which is desirable from the point of view of manipulation and dispenses with a very difficult heating of the starting polyolefin.

To achieve as much as possible simple homogenization of the mass containing the carrier substance and the polyolefin, it is expedient if the mass ratio of the carrier substance to the polyolefin is selected between 1:5 to 10:1.

In trying to achieve as much as possible rapid and simple course of the method, it is very important that the lime be easily mixed into the mass containing the carrier substance and the polyolefin and in order simply and rapidly to carry out this step of the method, it is expedient to provide that to the mass consisting of the carrier substance and the polyolefin or to the carrier substance before the addition of the polyolefin there be added an oil or an organic solvent, whose boiling temperature is 10° to 20° C. lower than the temperature of the in each case introduced polyolefin, forming with the carrier substance or the mass a solution.

It is also very advantageous if polyethylene is used as polyolefin and is used as carrier materials to select a mass ratio of oil or solvent to carrier substance with polyolefin of about 4:1.

If the presence of oil or solvent added in the last-mentioned embodiment of the method of the invention is compatible with the later use of the powder to be produced, said oil or solvent can be permitted to remain in the reaction mass. But as a rule it is preferable that oil or solvent be removed from the mass or from the powder containing a finely distributed synthetic material, and in this connection is particularly recommended in cases where an organic solvent is added to apply a method of thermally driving off or distilling off. Such driving off or distilling off can expediently be carried out by using the heat generated in the reaction of lime with aqueous slurry or by the heating of the mass caused by said reaction; the distilled-off solvent is expediently recirculated to make the method particularly economical.

The use of decalin and tetralin is particularly expedient in pulverizing polyethylene.

Considering high effectiveness of the powder-forming reaction and the objective of achieving low particle size of the powder components, it is expedient in the method of the invention to aim at a granular size below 0.1 mm of ground lime. To obtain a rapid powder-forming reaction and good distribution of the synthetic material particles, it is expedient to introduce a highly reactive, soft calcined lime. It is also favorable if the mass ratio of the mass containing the carrier substance and the polyolefin, without counting oil or solvent, to lime is between 1:2.5 and 1:3.5, preferably 1:2.8 to 1:3.

It is favorable for the manipulation in adding aqueous slurry and for the behavior of the reaction components in adding the aqueous slurry as well as from the point of view of precise dosing of the amount of water introduced with the aqueous slurry and provided, for reaction with lime, if the mass is cooled to a temperature of about 100° C. before the aqueous slurry is added.

It is important that the solid of the aqueous slurry which contains the reaction water for the reaction with the lime exhibits an adequate porosity, and that it does not interfere in the later use of the powder containing polyolefin. As a solid for the aqueous slurry along with, for example, rock flours, also flue dust and fuller's earth come into consideration.

A particularly advantageous embodiment of the method of the invention provides regarding the aqueous slurry the use of red slurry, which is a waste product in the production of aluminum. Such red slurry is readily obtainable and is available already in water-saturated condition, so that it does not have to be further processed; it exhibits a relatively high porosity, so that with a relatively small amount of slurry there can be supplied the reaction water necessary for the reaction with lime.

It is expedient for the powder-producing reaction to provide that the amount of slurry introduced is so selected that the ratio of water contained in the slurry to the mass of lime is between 1:1.8 and 1:2, preferably 1:1.9.

It favors the start-up and the course of the powder-forming reaction if the aqueous slurry is heated to a temperature above 75° C., preferably about 90° C., before being added to the mass containing the polyolefin, the carrier and the lime.

In order to control the point in time of starting the reaction of water introduced with the aqueous slurry into the mass with the lime present in the mass and to prevent a premature start of said reaction, which could disturb the course of the introduction of the aqueous slurry into the reaction mass and to prevent such occurrence, it is expedient that the aqueous slurry first be supplied to the surface of the mass, distributed thereover, and then rapidly stirred into the mass.

The method of the invention provides special advantages in producing powders containing polyolefins, particularly polyethylene.

The use of the bitumen preferably provided as a carrier substance is very favorable for the method of the invention. But also other carrier substances can be considered, such as hard paraffin, fats, and waxes, if the characteristics of the bitumen, which is present in ready powder, would prove to be harmful in the later use of the powder.

Figure 1:
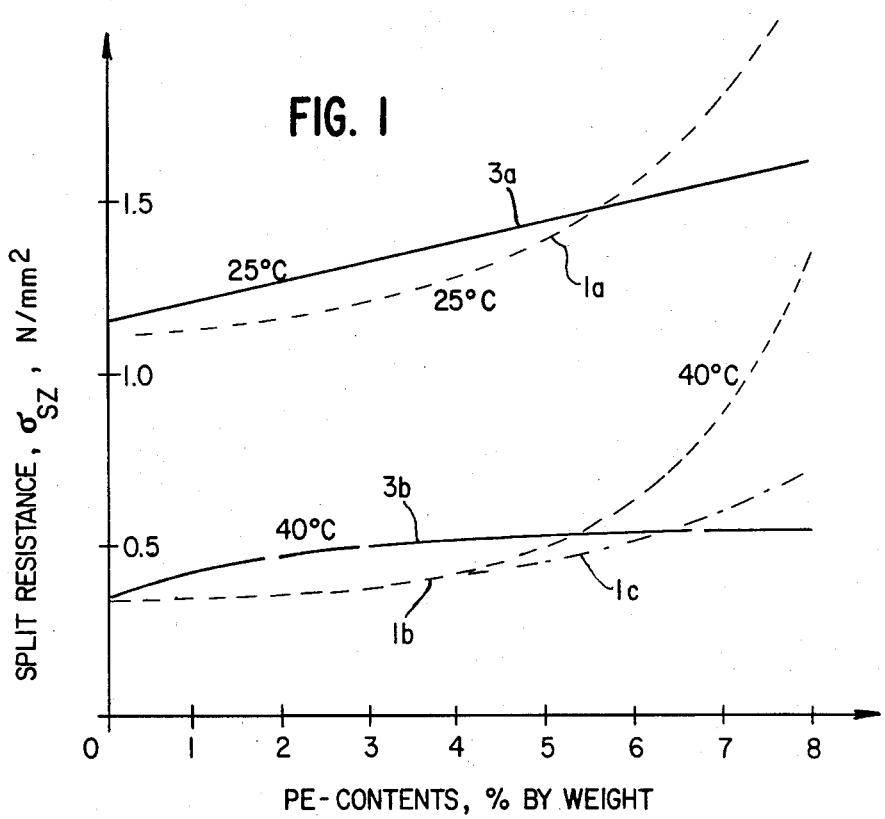
FIG. 1 illustrates the split resistance of masses with a different content of polyolefin in the binder as prepared according to the standard Marshall-bodies method and tested by conventional method.

The method of the invention for preparing a powder containing a finely distributed polyolefin will now be illustrated by several examples which should not be interpreted as limiting in any way.

EXAMPLE A 10 mass parts bitumen are heated in a heated container to a temperature of about 200° C., and 20 mass parts of coarsely distributed polyethylene waste are introduced in said so molten thin-liquid mass of bitumen; the so-produced mixture is mixed by stirring until a visually homogeneous mass is obtained. This produces a lightly pasty light colored melt. This melt is diluted by the addition of 40 mass parts decalin. In the so-produced, now relatively thin-liquid mass are mixed-into 84 mass parts of finely-ground lime of a particle size less than 0.1 mm. A highly reactive soft lime is used. After the lime is mixed into the mass and uniformly distributed, the mass was cooled to a temperature of about 100° C. This mass then was reacted with 100 mass parts red slurry, a waste product in the production of aluminum, containing a water content of about 40 to 50% mass, said red slurry having first been preheated to 90° C., then applied to the surface of the mass containing the carrier substance, the polyolefin, and lime, distributed over said surface, and then mixed with said mass by rapid, intensive stirring, thus rapidly beginning the reaction of water contained in the red slurry with lime contained in the mass. In this reaction, the lime was reacted with the reaction water to form calcium hydroxide, and the reaction produced from the entire mass a fine friable powder.

EXAMPLE B

The steps were the same as in Example A, namely, 200 mass parts bitumen were heated to about 200° C. 50 mass parts polyethylene in distributed form were introduced into this hot mass of bitumen, and the mixture was mixed to a visual homogeneity. Then were added 100 mass parts decalin and thereafter 210 mass parts lime were admixed, and the mass was then cooled to a temperature of about 100° C. This mass was then reacted with a previously formed mixture of 180 mass parts flue dust and 90 mass parts water which previously were carefully layered on the mass of bitumen-polyethylene-lime and then rapidly stirred. As a result of the reaction which then took place, a fine friable powder was produced from the entire mass.

The invention also relates to a method for producing a bituminously bound construction material, particularly a street construction material, containing a grain-stepped additive consisting of filler, sand, and crushed rock or gravel, and a binder, said binder being mixed with a polyolefin, such as polyethylene.

This method of the invention is characterized in that the polyolefin is added in the form of finely distributed particles, which are mixed with an inorganic material corresponding in particle size to a filler or are deposited on such particles, the polyolefin preferably being added in the form of a powder obtained by the above-described method of the invention.

The polyolefin provided with this method for modifying the binding characteristics of the bitumen can be in a simple way introduced into the construction material without the aid of special devices, and a very effective modification of the binder relative to the amount of polyolefin introduced can be achieved. Also, disadvantages which occur in known processes of improving by addition of synthetic materials bitumen which is used as a binder, such as, for example, occurrences of mixture separation of the pair of substances: bitumen-synthetic material, can be virtually eliminated.

Particularly advantageous in this connection is an embodiment of the method of the invention characterized in that the polyolefin is added in a mixing step where the additive is joined to the bitumen for preparing said construction material. In this connection, the powder containing the polyolefin can advantageously be introduced into a mixture consisting of a bituminous binder and the additive by a method usually being used for the addition of the so-called filler.

Both in order to achieve in as much as possible uniform distribution of the synthetic material in the bitumen and to well utilize the modification capacity of the polyolefin for the bitumen, it is expedient to provide that polyolefin having a particle size of less than 0.09 mm is used. It is also advantageous in introducing polyethylene as the polyolefin into the binder of the bituminously-bonded construction material if the ratio of the mass of the polyethylene to the mass of inorganic material with which the polyethylene is mixed or on which it is deposited, is about 1:7.5.

The method of the invention for producing bituminously-bonded construction materials will now be explained on the basis of the following examples.

EXAMPLE GROUP 2

Rock or sand material with a sieve line standardized for asphalt concrete 0/18 in a preheated condition to about 170° to 180° C. was introduced into an asphalt mixing apparatus and bitumen B100, likewise at a temperature of between 170° to 180° C. was introduced into the mixing apparatus by spraying. Likewise, calcium rock flour was filled in as a filler and then also powder containing polyolefin, which was preprepared according to Example A or Example B. Then one after another were prepared several masses to be used as a material for building streets, said masses differing regarding the amount of addition of the polyolefin containing powder. The amount of binder relative to the total amount of construction material, in which amount of binder should be counted bitumen B100 and the share of polyolefin of the powder containing the polyolefin, was held constant in all masses at 5.1% mass.

Also the same amount and composition of additive (rock or sand material, filler) was provided in all masses and the same (standardized) amount of filler was added; in this connection also the mineral share of the powder containing polyolefin material was counted as filler and also the bitumen share of the powder containing polyolefin was taken into account by a corresponding reduction of the bitumen introduced in each case to form each binder.

Figure 2:
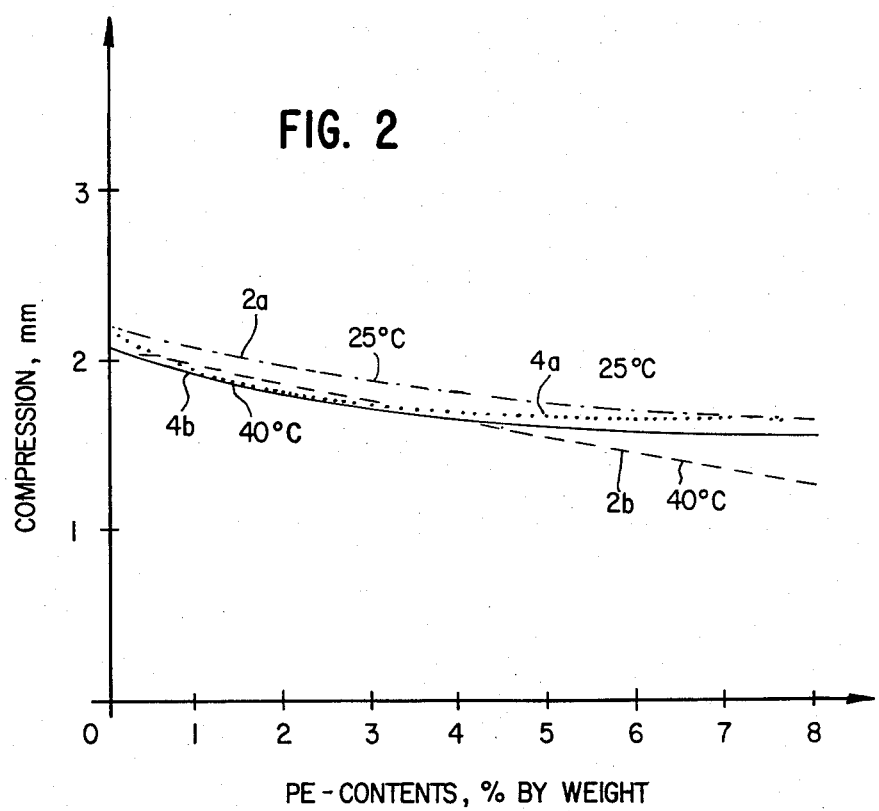
FIG. 2 illustrates the compression of masses with a different content of polyolefin in the binder also as prepared according to the standard Marshall-bodies method and tested by conventional method.

From, the masses obtained by intimate mixing of the said components in the asphalt mixing apparatus Marshall-bodies were prepared by the standard method, and these bodies were tested in conventional way, where particularly were determined the split resistance and compression. These tests were carried out at test temperatures of 25° C. and 40° C. The results of the measurements obtained from a series of masses with a different content of polyolefin in the binder are shown in diagrams of FIGS. 1 and 2. Curves 1a and 1b, 2a and 2b relate to a material which was prepared from polyolefin powder obtained by Example A; curve 1c relates to a material prepared from a polyolefin powder obtained according to Example B.

As can be seen from these diagrams, the split resistance illustrated by curves 1a, 1b, and 1c progressively increases as the content of polyethylene increases. A correlation computation was carried out, and it has shown that the dependency of the split resistance on polyethylene content can be described by a growth function (exponential function with positive exponent of the type: $y = a + b \cdot e^{cx}$).

The same conditions tendentially exist in the behavior illustrated by curve 1a at 25° C. as in the behavior at 40° C. illustrated by curves 1b and 1c.

The compression illustrated by curves 2a and 2b of the tested Marshall-body as can be understood from these curves degressively decrease as the polyethylene content increases. The relationship can be described by a falling saturation function (exponential function of negative exponential member and negative exponent $y = a + b \cdot e^{-cx}$). The relatively flat course of the curve representing the compression suggests that the compression of the Marshall-bodies is only slightly influenced by the polyethylene content of the binder, which indicates that the deformation capacity of asphalt is not to an undesirable extent reduced by the content of polyolefin and that there is no increase in the risk of tearing by the additional polyolefin. Materials which are prepared by the use of the polyolefin powder obtained according to Example B exhibit the corresponding behavior in the tests of compression.

The flexibility module computable on the basis of the tests on Marshall-bodies has a progressively increasing course as the content of polyethylene increases, and such course can be described by a growth function.

EXAMPLE GROUP 3

Comparative Tests

The steps were the same as in Example Group 2, and with the use of the same rock or sand material and of the same lime flour as a filler, there was prepared a number of bituminously bound mases provided for use as construction material for streets. The ratios of amounts of the rock or sand material and of the filler were provided equally as in Example Group 2. But as a binder was used pure bitumen B100 and bitumen B100, which was already modified by the addition of polyethylene. The amount of binder was held constant in all mixtures of this group of examples equally as with mixtures of Example Group 2 with 5.1% mass, relative to the total amount of construction material mass prepared in each case.

Several polyolefin modified bitumens with different contents of polyethylene were previously prepared by intensive homogenizing of an in each case correspondingly composed mixture of bitumen B100 and comminuted polyethylene at a temperature of 270° C. From each of these polyolefin modified bitumens and from pure bitumen B100 together with the above-mentioned rock or sand material and the filler was prepared a mass intended for use as a street construction material, and from these masses again in standardized method were prepared Marshall-bodies, which were tested in the same way as in Example Group 2. The results of measurements obtained in this connection are also shown in the diagrams in FIGS. 1 and 2.

In the same way as in the street construction materials prepared according to Example Group 2, the street construction materials prepared for comparison according to Example Group 3, as can be seen in curves 3a and 3b illustrating the split resistance of these street building materials, exhibit a split resistance increasing as the polyethylene content increases, and the dependency of the split resistance on the polyethylene content in the range under consideration can be described by a growing saturation function. Likewise, the compression of the street construction materials prepared according to Example Group 3, as can be seen from curves 4a and 4b illustrating the compression, slowly decreases as the polyethylene content increases, similarly as the compression of the street construction materials of Example Group 2.

The comparison of the values determined of the construction materials prepared by Example Group 2 of the invention with the corresponding values of construction materials prepared according to Example Group 3 shows that, until a certain content of polyolefin corresponding to each case and determined by the material components (rock, filler, bitument, synthetic material), the building materials prepared by the powder method of the invention have similar characteristic values (e.g., split resistance) as the construction materials having a substantially equal total composition and being prepared with the use of polyolefin modified bitumens that above such specific content of polyolefin, the characteristic values particularly the split resistance, of the construction materials prepared by the powder method of the invention, are much higher than the characteristic values of the construction materials prepared by using polyolefin modified bitumens.

I claim:

1. A method for producing a powder containing a finely distributed thermoplastic synthetic material which steps comprise introducing polyolefin into a non-aqueous carrier substance selected from the group consisting of bitumen, fats, paraffin and waxes at the melting temperature range of the synthetic material liquid and mixing the polyolefin and carrier to obtain a homogeneous mass; adding to said mass and distributing therein ground lime; and subsequently adding an aqueous slurry selected from the group consisting of red slurry which is a waste product in the production of aluminum, rock flours, flue dust and fuller's earth, to the mass, which is converted by the then-generated reaction between the lime and the aqueous slurry to a powder containing polyolefin.

2. The method according to claim 1, wherein to the mass consisting of the carrier substance and the polyolefin or to the carrier substance prior to the addition of the polyolefin, is added an oil, forming a solution with the carrier substance of the mass, or an organic solvent, which boiling temperature is between 10° to 20° C. lower than the decomposition temperature of the polyolefin.

3. The method according to claim 2, wherein the mass ratio of oil or solvent to bitumen is 4:1.

4. The method according to claim 2 or 3, wherein the oil or solvent during and/or after reaction of lime with the added aqueous solution, is distilled off from the mass.

5. The method according to claim 2 or 3, wherein the organic solvent is decalin or tetralin.

6. The method according to claim 1 or 2, wherein the carrier substance, before the introduction of the polyolefin, is heated to a temperature within the melting temperature range of the polyolefin.

7. The method according to claim 1 or 2, wherein the polyolefin is introduced at ambient temperature into the carrier substance.

8. The method according to claim 1 or 2, wherein the mass ratio of carrier substance to polyolefin is between 1:5 to 10:1.

9. The method according to claim 1 or 2, wherein the lime is ground to a granular size below 0.1 mm.

10. The method according to claim 1 or 2, wherein a highly reactive, soft calcined lime is introduced.

11. The method according to claim 1 or 2, wherein the ratio of the mass containing the carrier substance and the polyolefin to lime, without solvent, is between 1:2.5 and 1:3.5, preferably 1:2.8 to 1:3.

12. The method according to claim 1 or 2, wherein the mass is cooled to a temperature of about 100° C. before the addition of the aqueous slurry.

13. The method according to claim 1 or 2, wherein the amount of slurry introduced is so selected that the ratio of the mass of water contained in the slurry to the mass of lime is between 1:1.8 and 1:2, preferably 1:1.9.

14. The method according to claim 1 or 2, wherein before the aqueous slurry has been added to the mass containing the polyolefin, the carrier substance and lime are heated to a temperature above 75° C., preferably to a temperature about 90° C.

15. The method according to claim 1 or 2, wherein the aqueous slurry is first applied to the surface of the mass, is distributed thereon, and then rapidly mixed into the mass.

16. The method according to claim 1 or 2, wherein polyethylene is introduced as a polyolefin.

17. A method for preparing a bituminously-bound construction material, particularly a street construction material, containing a grain-stepped additive consisting of filler, sand, and crushed rock or gravel and a binder, said binder being mixed with a polyolefin, such as polyethylene, wherein the polyolefin is added in the form of finely distributed particles which are mixed with an inorganic material corresponding in particle size to a filler or are deposited on such particles, the polyolefin being preferably added in the form of a powder obtained by a method according to claim 1 or 2.

18. The method according to claim 17 wherein the polyolefin is added in a mixing step where the additive is joined to the bitumen for preparing said construction material.

19. The method according to claim 17 wherein the polyolefin has a particle size of less than 0.09 mm.

20. The method according to claim 17 wherein the ratio of the mass of the polyolefin to the mass of the inorganic material, with which the synthetic material is mixed or on which it is deposited, is about 1:7.5.

* * * * *